C. L. EMERY.
HANGING AND ADJUSTING DEVICE FOR MIRRORS.
APPLICATION FILED MAR. 1, 1913.
1,062,642.
Patented May 27, 1913.
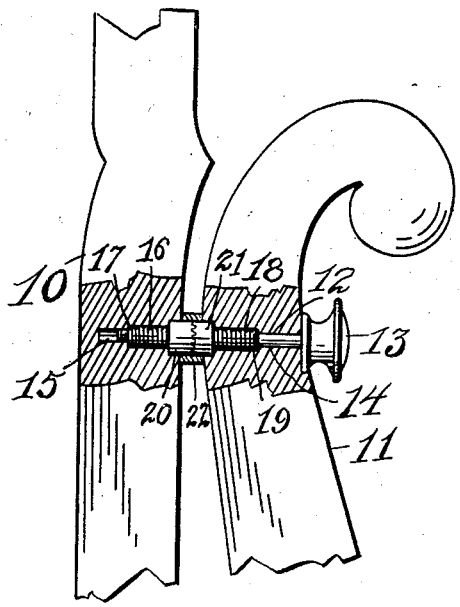
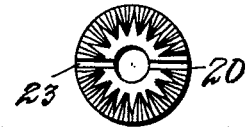
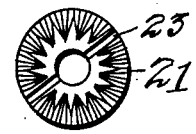
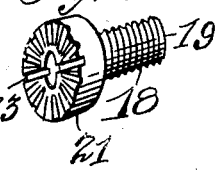
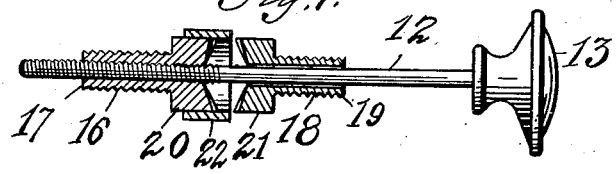
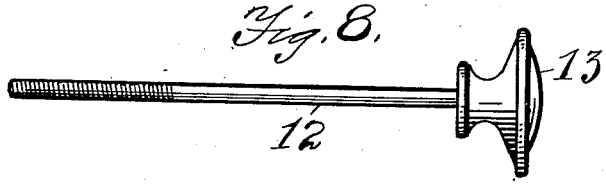
Witnesses
Arthur O. Morse
H. A. Sandburg
Inventor
Clyde L. Emery
By S. Arthur Baldwin,
Attorney

UNITED STATES PATENT OFFICE.

CLYDE L. EMERY, OF JAMESTOWN, NEW YORK.

HANGING AND ADJUSTING DEVICE FOR MIRRORS.

1,062,642.  Specification of Letters Patent.  Patented May 27, 1913.

Application filed March 1, 1913. Serial No. 751,487.

*To all whom it may concern:*

Be it known that I, CLYDE L. EMERY, a citizen of the United States, residing at the city of Jamestown, in the county of Chautauqua and State of New York, have invented certain new and useful Improvements in Hanging and Adjusting Devices for Mirrors, of which the following, taken in connection with the accompanying drawings, is a specification.

The invention relates to devices for hanging and adjusting mirrors on dressers, chiffoniers and similar pieces of furniture, and the object of the improvement is to provide a bolt for supporting each side of the mirror on the supporting standards which is arranged with a nut having a screw thread for screwing into the mirror frame and a sleeve threaded on its outer side for screwing into the supporting standard and smooth on its inner side to slide on said bolt, and having heads of the same size on the adjacent ends of said nuts and a sleeve fitting over said heads to aid in supporting the weight, said heads having adjacent cupping faces with radial grooves therein around their outer portion to hold the mirror at any desired angle, yet permitting it to be turned even when the nuts are tightened without injury to the nuts or to the mirror or standard; and the invention consists in the combination and construction of the parts as shown in this specification and the accompanying drawings and pointed out in the claims.

In the drawings, Figure 1 is an elevation of a portion of the mirror frame and supporting standard with the bolt therein, the wood being broken away to show the arrangement of the parts in position. Figs. 2 and 3 show the faces of the heads of the nuts with the radial grooves therein. Fig. 4 shows two flat rings of different widths for slipping over the nut heads. Figs. 5 and 6 show the two nuts in perspective. Fig. 7 is an elevation of the bolt with the nuts and sleeve thereon, the sliding bolt being separated from the internal threaded nut which screws onto the end of the bolt. Fig. 8 is an elevation of the bolt.

Like numerals of reference refer to corresponding parts in the several views.

The numeral 10 designates the mirror frame and the numeral 11 the supporting standard therefor.

The numeral 12 designates the bolt which has a knob 13 or other means for manually turning the same and which is inserted through a hole 14 in the standard 11 and into a hole 15 in the mirror frame 10. The adjacent ends of the holes 14 and 15 in the standard and mirror are enlarged to receive the threaded shank 16 of the nut 17 and the shank 18 of the sleeve 19, thereby holding the nut 17 and sleeve 19 in position in the mirror standard opposite one another and centered in the holes 14 and 15. The sleeve 19 is preferably loosely mounted on the bolt 12.

The head 20 of the nut 17 and the head 21 of the sleeve 19 are of exactly the same diameter to receive thereover the closely fitting sleeve or flat ring 22. The width of the ring 22 is adapted to the space between the standard and mirror frame. It is not necessary that the ring 22 should be of the same width throughout its circumference, that is, it may be narrower at the top than at the bottom to fit the space exactly between the frame standard and cover the joint between the faces of the two heads 20 and 21, and it is apparent that when so placed such a sleeve or ring 22 will support a large share of the weight of the mirror as well as cover the joint and improve the appearance of the bolt or sustaining device.

The adjacent faces of the nut 17 and sleeve 19 are preferably made slightly cupping and the outer edges are grooved radially at spaced distances, the cupping of the face making the grooves deepest adjacent to or near the peripheries of the heads, and it is apparent that when the two heads 20 and 21 are pressed against one another and the mirror is forcibly turned by some one who is ignorant of the manner in which it is held, the radial teeth can slip on one another without injury to said teeth or the heads of the nuts or woodwork. It is apparent that if the grooves extended radially from the bolt to the periphery of the nut head they would hold with such strength that either the wood of the standard or mirror would be injured or the nut head would be impaired by such a forcible turning.

In order to screw the nut 17 and sleeve 19 into the standard 11 and mirror frame 10 a groove 23 is provided in the nut 17 and a similar groove is provided in the sleeve 19 for turning the nut and sleeve by means of a suitable screwdriver or other tool that will fit these grooves 23 and 24.

It is obvious that the nut 16 being threaded externally and screwed into the mirror frame fixes the nut firmly in position and the same arrangement of the sleeve 19 fixes it opposite to the nut 16, and that the opening through the sleeve 19 being larger than the bolt 12 so as to loosely mount said sleeve 19 thereon permits the parts being adjusted as desired by means of the manual turning of the bolt 12. The sleeve 22 fitting closely over the equal sized heads 20 and 21 will bear the weight on said heads, the loose mounting of the sleeve 19 insuring such a support of the weight by the sleeve 22. It is also apparent that the large size of the heads 20 and 21 makes this support through the sleeve or ring 22 exceptionally strong, while it is exceedingly simple in its adjustment and attachment to the parts.

I claim as new—

1. In a device of the class described, a bolt, a nut for said bolt and means for attaching said nut to the mirror frame, a sleeve slidably mounted on said bolt and means for attaching said sleeve to the standard for said mirror frame, equal sized heads on said nut and sleeve adjacent one another, and a sleeve to fit over said heads to support the weight and cover the joint therebetween.

2. In a device of the class described, a bolt, a threaded nut for said bolt having an externally threaded shank for screwing into the mirror frame, a sleeve loosely mounted on said bolt having a threaded shank for screwing into a supporting standard for said mirror frame, adjacent heads on said nuts of the same diameter, a sleeve to fit closely over the peripheries of both of said heads to support the weight and cover the joint, intermeshing teeth on the adjacent faces of said heads, said faces cupped slightly to intermesh said teeth near the outer edges of said faces, substantially as and for the purpose specified.

In testimony whereof I have affixed my signature in the presence of two witnesses.

CLYDE L. EMERY.

Witnesses:
H. A. SANDBERG,
ARTHUR O. MORSE.

---

Copies of this patent may be obtained for five cents each, by addressing the "Commissioner of Patents, Washington, D. C."